W. G. EATON.
EDGE CHAMFERING MACHINE.
APPLICATION FILED NOV. 3, 1906. RENEWED MAR. 25, 1912.
1,029,178.
Patented June 11, 1912.
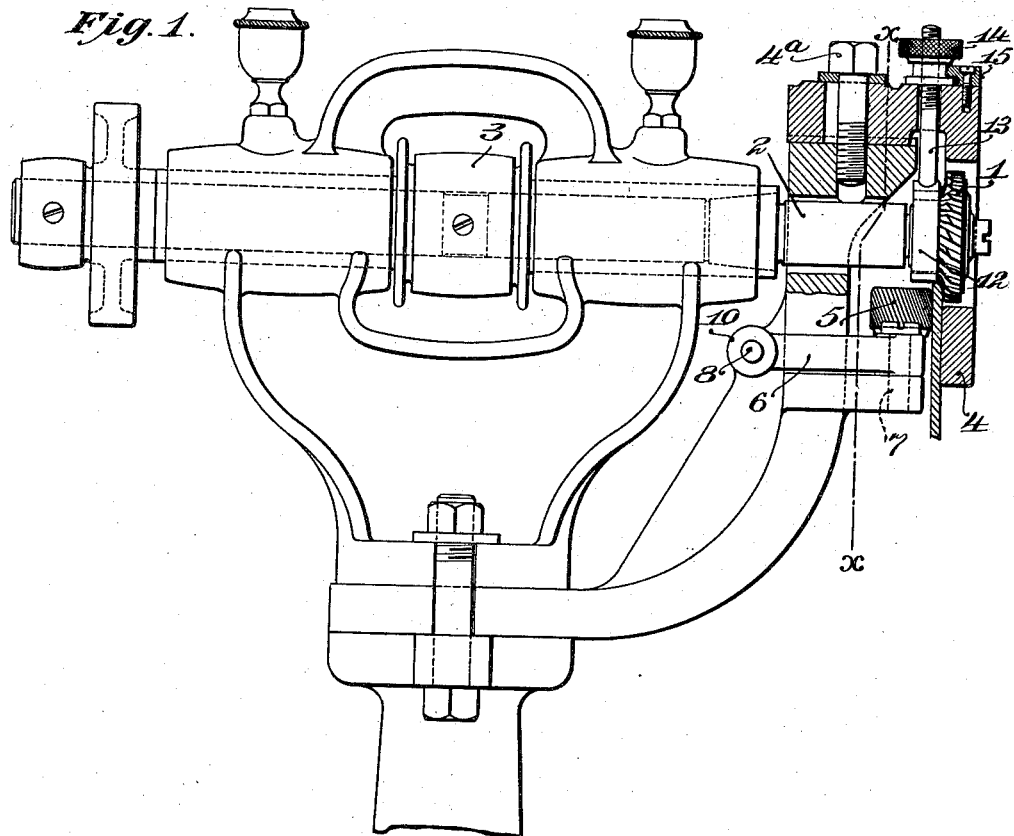
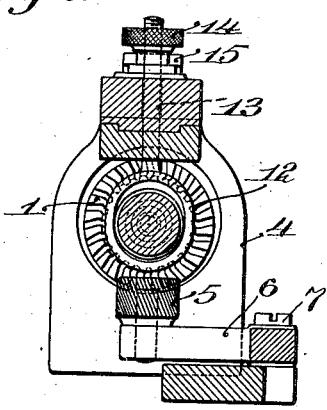
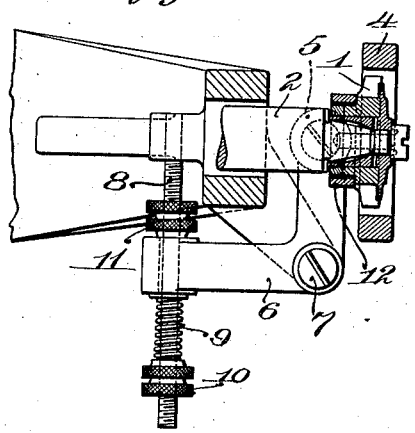
Witnesses:
E. C. Wurdeman
Alfred H. Hildreth
Inventor:
William G. Eaton
by his Attorneys
Phillips Van Everen & Fish

UNITED STATES PATENT OFFICE.

WILLIAM G. EATON, OF BOSTON, MASSACHUSETTS, ASSIGNOR TO UNITED SHOE MACHINERY COMPANY, OF PATERSON, NEW JERSEY, A CORPORATION OF NEW JERSEY.

EDGE-CHAMFERING MACHINE.

1,029,178.            Specification of Letters Patent.      Patented June 11, 1912.

Application filed November 3, 1906, Serial No. 341,834. Renewed March 25, 1912. Serial No. 686,009.

*To all whom it may concern:*

Be it known that I, WILLIAM G. EATON, a citizen of the United States, residing at Boston, in the county of Suffolk and State of Massachusetts, have invented certain new and useful Improvements in Edge-Chamfering Machines; and I do hereby declare the following to be a full, clear, and exact description of the invention, such as will enable others skilled in the art to which it appertains to make and use the same.

In the manufacture of welt shoes and McKay shoes the insole is formed with a margin of reduced thickness, forming the "feather", which bears against the inside of the upper and is in contact with the foot of the wearer. To prevent discomfort to the wearer, it is desirable to remove the sharp edge of the feather by beveling or chamfering this part, and the object of the present invention is to produce a machine for so chamfering the feather edge of an insole prior to its incorporation in a shoe.

The invention consists in the insole chamfering machine herein shown and described, as defined in the claims.

In the drawings, Figure 1 is a side elevation, partly in section, of a machine embodying the present invention. Fig. 2 is a vertical sectional detail view looking from left to right of the line $x-x$, Fig. 1. Fig. 3 is a horizontal section through the rotary cutter and the forward part of the machine.

The machine is provided with a rotary cutter 1 formed to cut upon its inner side; this cutter is mounted upon a spindle 2 driven by a pulley 3 connected with a suitable source of power. The cutter 1 is surrounded by a member 4, the lower part of which serves as a work support, being arranged so that its inner surface is adjacent to the cutting portion of the cutter. The work support projects downwardly from a block adjustably mounted on the frame of the machine and held in position by a clamping bolt 4ª. The work is held against the work support by a presser roll 5, mounted upon a bell-crank lever 6. The lever 6 is journaled at 7 upon the frame of the machine and embraces a threaded rod 8 fixed in the frame, upon which is mounted a compression spring 9. The spring bears against the lever 6 and tends to swing it in a direction to force the presser roll 5 against the work support, the strength of the spring being adjustable by means of nuts 10 on the rod 8. Stop nuts 11 prevent the presser roll from swinging into contact with the cutter when no work is in the machine. To limit the width of the chamfer produced by the cutter the machine is provided with an edge gage in the form of a somewhat elongated loop 12 surrounding the forward part of the spindle just inside of the operative portion of the cutter; this edge gage is mounted upon a stem 13 which is vertically adjustable in the frame of the machine by means of an adjusting nut 14 provided with an annular groove engaged by a detent 15 to prevent the nut from rising.

The machine is operated as follows:—The cutter being rotated, the margin of an insole is inserted between the presser roll and the work support in the position shown in Fig. 1, and the edge of the insole is pressed upward against the edge gage. The work is then fed by the operator, being held firmly against the cutter and the work support by the presser roll during the operation.

The cutter is preferably so formed as to impart a rounded surface to the edge of the feather rather than a flat bevel, and the work support member, since it surrounds the cutter, acts as a guard to catch the chips and dust produced by the cutter and prevent their being thrown about the machine.

The invention is not limited to the details of construction and operation of the illustrated embodiment, but may be embodied in other forms within the scope of the claims.

Having now described the invention, what is claimed is:—

1. An insole chamfering machine, having, in combination, a cutter arranged to chamfer the feather of an insole, a work support arranged to engage the surface of the insole acted upon by the cutter, and an edge gage adjustable to change the width of the chamfer on the feather, substantially as described.

2. An insole chamfering machine, having, in combination, a rotary cutter arranged to chamfer the feather of an insole, a work support to engage the surface of the insole acted upon by the cutter and an edge gage to determine the width of the chamfer on the feather, substantially as described.

3. An insole chamfering machine, having, in combination, a rotary spindle, a cutter mounted thereon and formed to cut on its inner side, an edge gage encircling the spindle at the inside of the cutter and fixed to an adjustable stem, and means for adjusting the stem to move the operative extremity of the edge gage toward or from the axis of rotation of the cutter, substantially as described.

4. An insole-chamfering machine, having, in combination, a rotary cutter formed to cut on one side, a work support having a flat work-supporting surface perpendicular to the axis of rotation of the cutter and adjacent to the periphery thereof, a spring-pressed presser for holding the work against the work support and the cutter, and an edge gage for determining the distance of the edge of the work from the axis of rotation of the cutter, substantially as described.

5. An insole-chamfering machine, having, in combination, a rotating spindle, a cutter mounted thereon and formed to cut on its inner side, a work support surrounding the cutter and having a flat work-supporting surface perpendicular to the axis of rotation of the cutter and adjacent to the inner side of the cutter, a spring-pressed presser for holding the work against the work-support, and an edge gage located between the presser and the spindle, substantially as described.

6. An insole chamfering machine, having, in combination, a rotary cutter arranged to chamfer the feather of an insole, a work support arranged outside of the cutter in position to engage the surface of the insole acted upon by the cutter, and an edge gage adjustable to change the width of the chamfer on the feather, substantially as described.

7. An insole chamfering machine, having, in combination, a cutter arranged to chamfer the feather of an insole, a work support arranged to engage the surface of the insole acted upon by the cutter, an edge gage adjustable to change the width of the chamfer on the feather and a presser coöperating with the work support to hold the work in position to be acted upon by the cutter, substantially as described.

In testimony whereof I affix my signature, in presence of two witnesses.

WM. G. EATON.

Witnesses:
   FRED O. FISH,
   FARNUM F. DORSEY.

---

Copies of this patent may be obtained for five cents each, by addressing the "Commissioner of Patents, Washington, D. C."